United States Patent
Mincarelli

(10) Patent No.: US 9,465,663 B2
(45) Date of Patent: Oct. 11, 2016

(54) ALLOCATING RESOURCES IN A COMPUTE FARM TO INCREASE RESOURCE UTILIZATION BY USING A PRIORITY-BASED ALLOCATION LAYER TO ALLOCATE JOB SLOTS TO PROJECTS

(75) Inventor: John R. Mincarelli, Weare, NH (US)

(73) Assignee: SYNOPSYS, INC., Mountain View, CA (US)

( * ) Notice: Subject to any disclaimer, the term of this patent is extended or adjusted under 35 U.S.C. 154(b) by 1538 days.

(21) Appl. No.: 12/263,126

(22) Filed: Oct. 31, 2008

(65) Prior Publication Data
US 2010/0115526 A1 May 6, 2010

(51) Int. Cl.
*G06F 9/50* (2006.01)
*G06F 9/48* (2006.01)

(52) U.S. Cl.
CPC ............ *G06F 9/5038* (2013.01); *G06F 9/485* (2013.01); *G06F 9/5005* (2013.01); *G06F 9/5027* (2013.01); *G06F 2209/503* (2013.01); *G06F 2209/5021* (2013.01)

(58) Field of Classification Search
None
See application file for complete search history.

(56) References Cited

U.S. PATENT DOCUMENTS

| | | | |
|---|---|---|---|
| 5,421,011 A * | 5/1995 | Camillone et al. | 718/104 |
| 7,509,671 B1 * | 3/2009 | Bedell et al. | 726/6 |
| 2001/0029519 A1 | 10/2001 | Hallinan | |
| 2005/0114860 A1 * | 5/2005 | Lin et al. | 718/100 |
| 2005/0283534 A1 * | 12/2005 | Bigagli et al. | 709/229 |
| 2005/0283782 A1 * | 12/2005 | Lu et al. | 718/100 |
| 2007/0044102 A1 * | 2/2007 | Casotto | 718/103 |
| 2008/0052712 A1 * | 2/2008 | Gustafson et al. | 718/101 |
| 2008/0162760 A1 | 7/2008 | Jacob | |
| 2009/0113434 A1 * | 4/2009 | Podila | 718/102 |
| 2009/0119673 A1 * | 5/2009 | Bubba | 718/104 |
| 2009/0282414 A1 * | 11/2009 | Branda et al. | 718/103 |

FOREIGN PATENT DOCUMENTS

WO 2006099062 A1 9/2006

OTHER PUBLICATIONS

Platform (Administering Platform LSF)—Version 7 Update 2; Release date: Nov. 2007; Last modified: Jan. 31, 2008; pp. 14, 15, 22, 25, 114, 115, 129, 277, 279, 298, 347, 389, 447, 472, 481, 483, 488, 489, 490, 492; full document accessible from http://support.sas.com/rnd/scalability/platform/.*

* cited by examiner

*Primary Examiner* — Keith Vicary
(74) *Attorney, Agent, or Firm* — Park, Vaughan, Fleming & Dowler LLP; Laxman Sahasrabuddhe

(57) ABSTRACT

Some embodiments provide a system for allocating resources in a compute farm. During operation, the system can receive resource-requirement information for a project. Next, the system can receive a request to execute a new job in the compute farm. In response to determining that no job slots are available for executing the new job, and that the project associated with the new job has not used up its allocated job slots, the system may execute the new job by suspending or re-queuing a job that is currently executing, and allocating the freed-up job slot to the new job. If the system receives a resource-intensive job, the system may create dummy jobs, and schedule the dummy jobs on the same computer system as the resource-intensive job to prevent the queuing system from scheduling multiple resource-intensive jobs on the same computer system.

9 Claims, 5 Drawing Sheets

ALLOCATING RESOURCES IN A COMPUTE FARM TO INCREASE RESOURCE UTILIZATION BY USING A PRIORITY-BASED ALLOCATION LAYER TO ALLOCATE JOB SLOTS TO PROJECTS

BACKGROUND

1. Field of the Invention

The present invention generally relates to distributed computing. More specifically, the present invention relates to methods and apparatuses for allocating resources in a compute farm.

2. Related Art

The availability of cheap hardware has given rise to distributed computing systems called compute farms in which a large number of computer systems, e.g., servers, are coupled together using a high-speed network. Compute farms are being used by many enterprises for performing compute-intensive tasks. Specifically, compute farms have been used to perform a wide variety of tasks, including, but not limited to, computer-aided design, graphics rendering, software compilation, and database query processing.

Conventional techniques usually use a queuing system to manage resources in a compute farm. In the conventional approach, a system administrator typically configures the queuing system according to a company's standard usage policies. When a project needs guaranteed resources to meet a milestone, the system administrator typically dedicates a set of computer systems in the compute farm for the project. Unfortunately, this approach can lead to reduced utilization if the project does not use all of the dedicated resources. Further, note that the system administrator typically has to manually reconfigure the queuing system to dedicate the resources, and hence, this approach inherits all of the drawbacks and risks that accompany any procedure that requires manual intervention.

Hence, there is a strong need to find systems and techniques to allocate resources in a compute farm without the above-described drawbacks.

SUMMARY

Some embodiments of the present invention provide a system that can enable a project owner to ensure that the project completes on time. The system can receive information about the amount of job slots that a project needs, and can dynamically map the job slot requirements to the job slots within a compute farm. The system can be used with a queuing system which schedules jobs in the compute farm. Note that queuing systems typically do not understand the concept of time and resource planning over multiple days or weeks. Some embodiments can incorporate a multi-week rolling schedule to enable managers to schedule work in the future.

The system can manipulate a job's priority within a queuing system to aid the queuing system to place the job. If a job has been pending for more than a predetermined period, and if the pending job is associated with a project that has an allocation, the system can dynamically manipulate jobs in the compute farm so that the queuing system schedules the pending job. Note that the system can use information received from a management interface to determine the project that is associated with the job, and to determine whether the project has an allocation.

Specifically, during operation, the system can receive resource-requirement information for a project. The resource-requirement information can enable a resource manager to specify that, during a particular week, a certain number of jobs slots should be allocated to a particular project, or to a particular user assigned to the project, or to a particular user to execute jobs for a step in a flow in the project. Note that the resource requirements can be specified for a number of weeks in the future, e.g., up to twelve weeks in the future.

Next, the system can receive a request to execute a new job in the compute farm. The system can use the resource-requirement information to determine if the new job is associated with a project for which job slots have been allocated. Next, the system can determine if the compute farm has any available job slots. Additionally, the system can determine if it has already allocated all of the job slots that were allocated for the project to jobs that are associated with the project. If the system has available job slots in the compute farm, the system can allocate an available job slot to the new job. If the system does not have any available job slots, and the system has already assigned all of the allocated job slots to jobs that are associated with the project, the system can place the new job in a queue.

On the other hand, if the system does not have any available job slots, and if the system has not assigned all of the allocated job slots to jobs that are associated with the project, the system can execute the new job by: suspending or re-queuing a job that is currently executing, and allocating the freed-up job slot to the new job. Specifically, a user can select whether the job should be suspended or re-queued. For example, the user can specify the selection by using an environment variable. Note that the system can dynamically and deterministically re-queue a job based on various attributes, which include, but are not limited to, the time the job was started, the level of over-subscription of the project that is associated with the job, the number of pending jobs for all active projects, the amount of resources currently consumed by the job, and the run-time limits for the job.

In this manner, the system can make it appear as though the system has dedicated a certain number of job slots to a project, but in reality, the system has not dedicated the job slots to the project. Instead, when the project is not using the allocated job slots, the system assigns the allocated job slots to other jobs, but the system ensures that the allocated job slots will be assigned to the project when the project needs them.

Usually, each job slot represents a standard amount of resources in the compute farm. Hence, when the queuing system allocates a job slot to a job, it implicitly assumes that the standard amount of resources will be sufficient to execute the job. However, some jobs may require more resources than the standard amount of resources. If the queuing system schedules multiple resource-intensive jobs on the same computer system, it can lead to serious performance problems, such as thrashing.

Some embodiments of the present invention use dummy jobs to prevent the queuing system from scheduling multiple resource-intensive jobs on the same computer system. Specifically, if the system receives a resource-intensive job, the system may create dummy jobs, and schedule the dummy jobs on the same computer system as the resource-intensive job to prevent the queuing system from scheduling multiple resource-intensive jobs on the same computer system. Note that the dummy jobs are expected to use only minimal resources, and hence, scheduling the dummy jobs on the same computer as the resource-intensive job is not expected to degrade the performance of the computer system.

Furthermore, if the system receives a light job, the system can execute the light job in a job slot that is currently allocated to a dummy job. A light job can be a job that uses an amount of resources which is less than the standard amount of resources. In particular, if the queuing system executes the light job on the same computer system as the resource-intensive job, the computer system's performance is not expected to substantially deteriorate. In this manner, the system can improve the compute farm's utilization, and at the same time, ensure that the queuing system does not create performance problems by scheduling multiple resource-intensive jobs on the same computer system.

DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Compute Farm

Availability of cheap hardware has given rise to distributed computing architectures in which a large number of computer systems are coupled together using a high-speed network. These distributed architectures are sometimes called compute farms, and are often used to perform compute-intensive tasks. For example, compute farms have been used for computer-aided design, graphics rendering, electronic design automation, software compilation, database query processing, etc.

Figure 1:
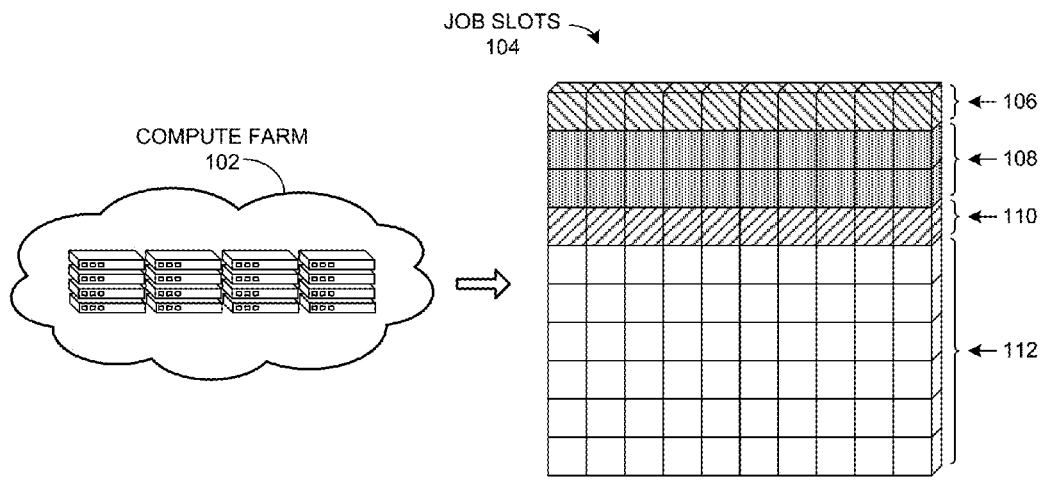
FIG. 1 illustrates a compute farm in accordance with an embodiment of the present invention.

FIG. 1 illustrates a compute farm in accordance with an embodiment of the present invention.

Compute farm 102 includes a large number of computers which are coupled together using a network. The computers that make up the compute farm can be located within a single building, e.g., a data center, or they can be spread out across the world.

What usually distinguishes a compute farm from a generic computer network is that a compute farm typically includes software which enables users to execute jobs on the compute farm as a whole. In other words, the software hides the details of the compute farm architecture from the user. The software provides an abstraction of the resources in a compute farm which makes the compute farm more user friendly, and it also makes the compute farm much easier to manage and maintain. For example, to execute a job on the compute farm, the user does not have to know the network addresses of the computers or the loads of the different computers. Instead, the user simply provides the job to the software that manages the compute farm, and the software then determines how and when to execute the job.

In one embodiment, the software enables users to view the compute farm as a collection of job slots. A job slot is a generalized resource unit which can be used to execute a job. For example, a job slot can represent a dedicated processor with a specific amount of memory, or it can represent only a percentage of a processor's time with no memory guarantees. Further, job slots can be of different types, e.g., some job slots may be reserved for highly interactive jobs, whereas other jobs slots may be reserved for compute-intensive jobs.

For example, compute farm 102 can be viewed as a collection of job slots 104. Job slots 104 may be divided into different categories based on the different types of jobs. For example, job slots 104 can include light interactive job slots 106, heavy interactive job slots 108, overflow job slots 110, and batch job slots 112. Light interactive job slots 106 can be used to execute jobs which require user interaction and which are not expected to be computationally intensive. Heavy interactive job slots 108 can be used to execute jobs which require user interaction and which are expected to be computationally intensive. Overflow job slots 110 can be used to execute "overflow" jobs, i.e., jobs for which the system was unable to find an unused job slot. Batch job slots 112 can be used to execute compute-intensive jobs which do not require user interaction. Batch job slots 112 can also be used to execute high priority jobs which require dedicated resources.

Different types of job slots may represent different amounts of resources. For example, since light interactive jobs are not expected to be computationally intensive, each light interactive job slot may represent a small amount of processor and memory resources. Stated differently, a single computer in the compute farm can accommodate a large number of light interactive job slots. In contrast, a batch slot can represent a large amount of processor and memory resources, e.g., a dedicated computer system.

Figure 2:
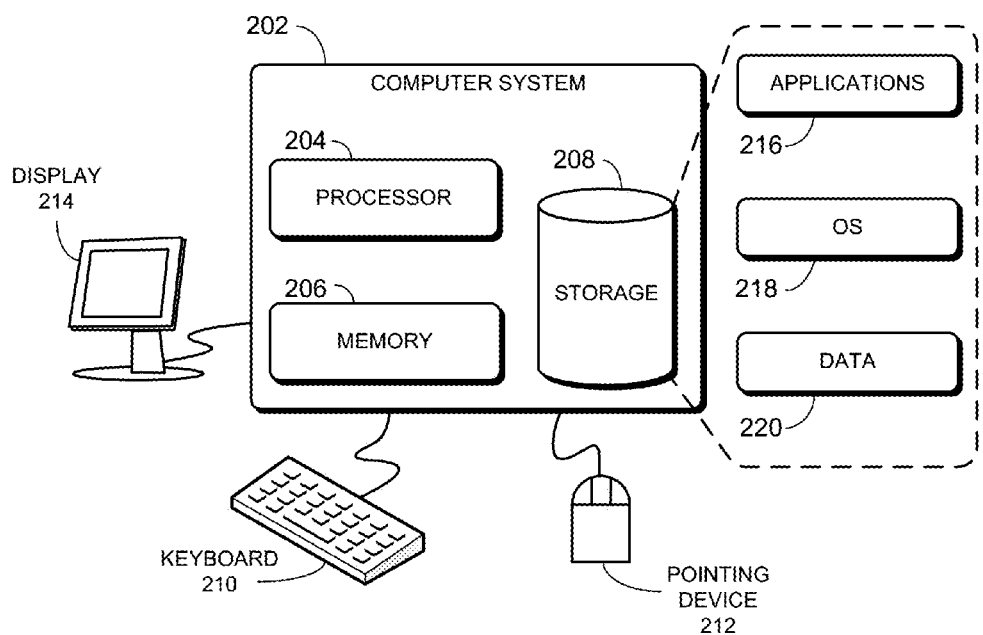
FIG. 2 illustrates a computer system in accordance with an embodiment of the present invention.

FIG. 2 illustrates a computer system in accordance with an embodiment of the present invention.

Computer system 202 comprises processor 204, memory 206, and storage 208. Computer system 202 can be coupled with display 214, keyboard 210, and pointing device 212. Storage 208 can store applications 216, operating system 218, and data 220. Note that a computer system in a compute farm is usually not coupled with input/output devices. However, the computer system may be coupled with input/output devices during maintenance.

Each computer system in a compute farm is usually a "stand alone" computer system, i.e., each computer system has its own operating system, and it executes jobs by loading jobs in its memory and executing the associated instructions on its processor. A compute farm typically cannot move a job that is executing on one computer system to another computer system without losing state. In other words, in a compute farm, moving a job from a first computer system to a second computer system usually involves stopping the job on the first computer system and restarting the job from scratch on the second computer system. In this respect, a compute farm may be different from a distributed system which appears as a single computer system to the end user and which supports seamless migration of jobs.

The foregoing descriptions of a computer system and a compute farm have been presented only for purposes of illustration and description. They are not intended to be exhaustive or to limit the present invention to the forms disclosed. In general, a computer system in a compute farm can be any system that is capable of processing data and that is capable of communicating with other computer systems. Specifically, a compute farm can include a multiprocessor system and/or a computer system with a processor which has multiple cores.

Resource Allocation

Conventional techniques for allocating resources in a compute farm typically use a queuing system. For example, the Load Sharing Facility (LSF) software from Platform Computing, Inc. is a queuing system which can be used to allocate resources in a compute farm.

A queuing system typically keeps track of the available job slots in a compute farm and assigns the job slots according to a set of rules. A queuing system usually supports multiple queues that have different priority levels. The jobs that are submitted to the queue can be handled using different queuing disciplines. For example, the queuing system may handle jobs in a queue based on a first-come, first-serve basis. Alternatively, the queuing system may handle jobs in a queue based on the job's priority which may be dynamically configurable.

For example, a queuing system may have three queues: a low priority queue, a normal priority queue, and a high priority queue. The queuing system may guarantee that the jobs in the high-priority queue will always be executed before the jobs in the normal-priority queue or the low-priority queue. Further, the queuing system may guarantee that the jobs in the normal-priority queue will always be executed before the jobs in the low priority queue. Alternatively, the system may dedicate certain computer systems to the high priority queue, and these computer systems may not be used by jobs in the normal priority queue or the low priority queue even if they are idle.

Depending on the importance of the job, a user can submit a job to the appropriate queue. Additionally, the queuing system may guarantee that within a particular queue, jobs that have a higher priority or which were received earlier will be executed before jobs that have a lower priority or which were received later.

Unfortunately, even though conventional queuing systems are sophisticated, they do not adequately address many problems that large organizations face on a daily basis. For example, a company may have tens of product groups, each with tens or hundreds of engineers who are sharing a compute farm. During normal operation, the engineers submit their jobs to the compute farm and the queuing system, e.g., LSF, determines how to schedule the job. However, when a project nears a deadline, the project manager may request that jobs associated with the project be given a higher priority.

The conventional way to deal with such situations is to dedicate a certain number of computer systems to the project or to create a separate high-priority queue for the project. Unfortunately, these conventional approaches have many serious drawbacks.

First, these approaches can result in lower utilization if the dedicated computer systems are not used to their fullest extent. Second, these approaches are not automated, i.e., they require manual intervention which is time consuming and error prone. Typically, an information technology (IT) administrator has to manually reconfigure the queuing system to create a new high-priority queue or to dedicate a certain number of computer systems to the high-priority project. Third, these approaches can impact the whole system which can lead to unintended consequences. For example, when the IT administrator creates a new high-priority queue or dedicates some computers to a particular project, it can take away resources from another project which can cause it to miss its deadline. In other words, when a project's priority is changed, the conventional approach does not provide a way to minimize the impact on other projects. Finally, the conventional approach is ad hoc, i.e., it does not use a systematic way of ensuring that the queuing system is used to schedule jobs in accordance with the organization's priorities. Specifically, in the conventional approach, the amount of resources that are allocated to a project may depend more on the project manager's clout within the organization, instead of depending on the importance of the project itself.

Hence, there is a need for systems and techniques that facilitate managing jobs in a compute farm to improve resource utilization and to ensure that the resource allocation is in accordance with an organization's priorities.

Some embodiments of the present invention improve resource utilization in compute farms that use the LSF queuing system, thereby enabling greater engineering throughput, higher productivity, better return on investment, and lower costs. Specifically, some embodiments of the present invention use a layer of virtualization and rule-based management on top of LSF to enable an organization to efficiently use fewer but larger compute farms with reduced administrative overhead. Furthermore, some embodiments of the present invention enable efficient planning and scheduling with real-time re-allocation of idle resources to achieve a new level of scalability for small to massive compute farms.

Priority-Based Allocation (PBA)

PBA is a layer of automation that augments a queuing system by combining scheduled resource allocation with on-demand dynamic re-allocation of resources based on allocation schedules and priority. PBA can help improve utilization of batch compute resources by allowing previously idle processors that were dedicated for use by a particular project to be used opportunistically by others. PBA can reduce the need for human intervention to manually reconfigure the queuing system to meet changing end-user demands, reducing administrative overhead and potential for human error. PBA can contains a full complement of automated reports that can provide proactive feedback to users, project leads, resource managers, and queuing system experts to optimize utilization and provide predictable results.

PBA can include an online allocation system that allows authorized resource managers and non-queuing system administrators to prioritize and schedule resource usage and to map the needs of multiple projects to the available batch compute resources. PBA can understand and facilitate allocations based on the concept of a project, the UNIX group identifier (GID) associated with a project (for security purposes), personnel associated with a project, and the steps in a work flow that may require unique resource allocations. When a job is submitted to the queuing system, the PBA system lets the queuing system try and schedule it as it is normally configured to do so.

An over-subscribed project can be defined as a project that is executing more jobs than the number of job slots allocated to it. For example, if a project has an allocation of 10 job slots, and it has 100 jobs running on the compute farm, the project can be considered to be over-subscribed by 90. An under-subscribed project can be defined as one that is executing fewer jobs than the number of job slots allocated to it. If a job is pending, and if the job is associated with a project with an allocation, PBA can dynamically determine the least valued job in the farm and initiate the appropriate action. Note that the job slot which is executing the least valued job is referred to as the low-priority job slot. A project that does not have an allocation is assumed to have an allocation of zero job slots, and hence, the project will be over-subscribed even if the project executes a single job in the compute farm. Note that PBA jobs can have their priority manipulated immediately upon entry into the queuing system and can be tagged as PBA jobs.

If the demand for resources exceeds the supply, PBA can automatically find and free-up job slots associated with over-subscribed jobs by re-queuing or suspending the jobs. PBA can free up one over-subscribed job slot for each under-subscribed job that has been pending for more than a configurable time period on a one-for-one basis. The net effect is that instead of administrators having to manually create new queues for projects and to dedicate resources to projects, PBA adds a layer of abstraction so that job slots appear to be dedicated to the projects because PBA dynamically re-allocates the job slots to the projects when the projects require them.

Note that PBA does not allocate more job slots to a project than the allocated number of job slots. Typically, the total number of job slots that are allocated to projects via PBA is less than the total number of job slots in the queuing system. For example, the compute farm may support 1000 batch job slots, and the total number of job slots allocated by PBA may be 850. If the resource-requirement information for a project specifies that the project needs 100 job slots, then PBA will only allocate up to 100 job slots to the project. This is in contrast to airline reservation systems which typically overbook a flight because some passengers are expected to cancel their reservations. For example, an airline reservation system may reserve seats for 430 passengers even though the airplane only has 400 seats.

PBA increases resource utilization and improves user productivity. It enables project managers to plan more effectively and achieve predictable results. PBA also reduces queuing system complexity. Finally, it provides an efficient means to guarantee job slot reservations without implementing potentially wasteful dedicated queues, without re-writing job submission scripts, and without any user intervention. Job slot allocations can be easily made at any time using PBA's graphical user interface, and the changes take effect within a short duration without any noticeable overhead.

In some embodiments, the system performs a series of qualification checks for every job before the job enters the queuing system. This pre-qualification step is asynchronous to PBA which places jobs according to the job slot allocations. In the pre-qualification step, the system can verify if a pre-defined "Project" tag has been set for the job. If so, the system can then verify (1) whether the project name as identified by the "Project" tag is a valid project name, (2) whether the user submitting the job is a valid member of the project, and (3) whether job slots have been allocated for the project. If the job passes all of these tests, the job may be modified with an internal tag to enable the system to track it within the compute farm. Once the pre-qualification steps are completed, the job can then be processed by the queuing system. If the job fails any of these tests, the system can communicate the failure to the user and place the job in the lowest priority queue within the queuing system. In some embodiments, jobs in the lowest priority queue are scheduled only if there are idle jobs slots of the lowest priority, and even after being scheduled, these jobs may be pre-empted by higher priority jobs. Once the job's priority is appropriately modified, the job can be processed by the queuing system in a normal fashion.

In a UNIX environment, the system can schedule a "cron" job to make modifications to the job's priorities, and to schedule activities. In each cycle, the system can determine if there are any jobs that it has tagged for allocation. If it finds a tagged job, the system can increment the job's priority. The system may use different increment values for each type of job. Note that the "cron" cycle duration and the increment values can be configurable.

In some embodiments, the increment used for a PBA job (i.e., a job which is associated with a project that has an allocation) may be greater than the increment used for a re-queued job. As an illustrative example, the system may initially assign a default priority value of 20 to jobs. The system may use a base increment value of 100 to increment the priority of a PBA job, and a base increment value of 10 to increment the priority of "re-queued" jobs.

For example, suppose a new job enters the queuing system. The system may begin by assigning it the default priority value of 20. Next, the system can detect whether the job has an associated allocation, and if so, the job's priority can be modified to be 20 plus 100 for a new value of 120. Next, in each "cron" cycle, the system can increment the job's priority by one. Thus, assuming that the "cron" cycle is 20 seconds, the priority of the job after 60 seconds would be 122: initially the priority would be 20, after the first "cron" cycle it would be 120, after the second "cron" cycle it would be 121, and finally, after the third "cron" cycle it would be 122.

Each time the job is re-queued, the system can increment the priority by the re-queue increment. Re-queued jobs can be stored in a database so that the system can increment their priority values in each "cron" cycle. For example, when a new job is submitted to the system, the system may assign the default priority of 20 to the new job. Next, if the job is in the pending state for two "cron" cycles, the system may increment the job's priority by one in each "cron" cycle so that at the end of two "cron" cycles, the job's priority will be 22. The system may then schedule the job. If the job is subsequently re-queued, the system will increment the job's priority when the job was scheduled (22) by the re-queue increment (10) so that the job's priority is equal to 32. The system can then increment the job's priority while it is in the pending state. For example, if the job is in the pending state for one "cron" cycle, the system may increase the job's priority to 33. After that, if the job is scheduled in the system, and then again re-queued, the system will assign a priority of 43 to the job which is equal to the job's priority when it was scheduled (33) plus the re-queue increment (10). The system may keep track of the number of times a job is re-queued, and ensure that a job that has already been re-queued a certain number of times is not re-queued again.

By using appropriate increment values, the system can ensure that PBA jobs have higher priority than normal jobs. Further, the system can ensure that all jobs which were re-queued to enable an allocation job to run are put back into the queuing system with a higher in priority than a normal job that just entered the system. In this manner, the system can ensure that re-queued jobs are scheduled before normal jobs. Additionally, if a job has an allocation, and is pending for more than a predetermined time period, the system can determine the least valued job in the farm, and replace the least valued job with the pending job which is associated with a project that is under-subscribed.

Figure 3:
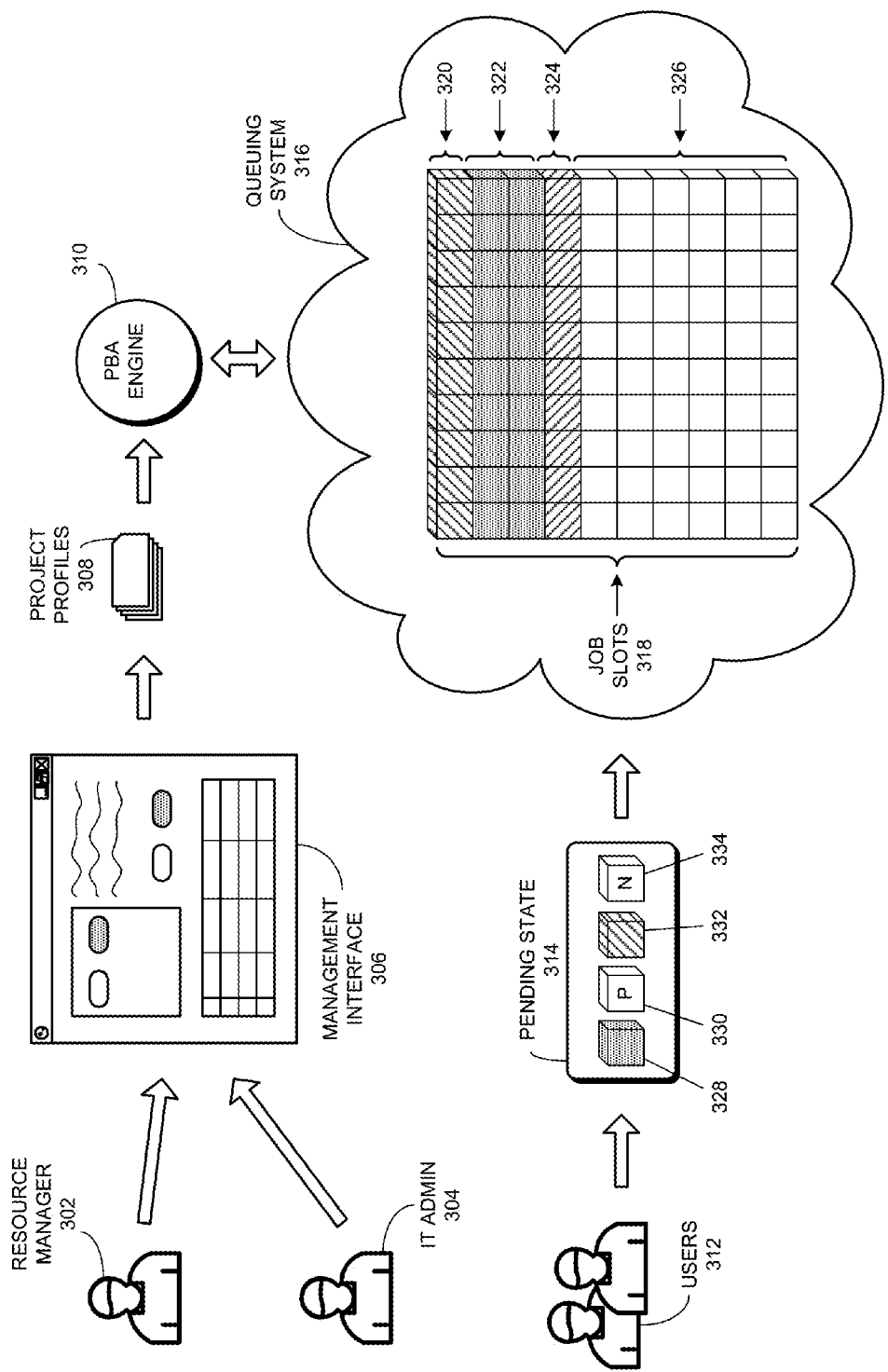
FIG. 3 illustrates a priority-based allocation system in accordance with an embodiment of the present invention.

FIG. 3 illustrates a priority-based allocation system in accordance with an embodiment of the present invention.

Resource manager 302 and information technology (IT) administrator 304 can use management interface 306 to submit project profiles 308. A project profile can specify the amount of resources that need to be allocated for the project. Specifically, a project can include a sequence of steps, wherein each step is associated with a set of jobs. For example, a chip design project may include the steps of logic design, synthesis, netlist verification, physical verification, resolution enhancement, and mask data preparation. Further, each step in a project can be associated with a specific set of jobs. For example, the synthesis step may involve executing a logic compiler, the resolution enhancement step may involve executing optical proximity correction software, etc. Note that a job can spawn one or more processes when it is executed on a computer system. In addition to enabling resource manager 302 to allocate resources specifically for a step in a project, the system can also enable resource manager 302 to allocate the resources for a particular user. For example, the allocation may only apply when a particular user executes a job, but not if another user executes the same job.

The project profile may also indicate the service level agreement (SLA). Specifically, the system may support a velocity SLA and a throughput SLA. A velocity SLA indicates that the system should try to complete as many jobs as possible in the shortest possible time. The system typically executes as many jobs in parallel as it can for the project to fulfill a velocity SLA. A throughput SLA, on the other hand, specifies the number of jobs that need to be completed within a specified amount of time. Hence, in this type of SLA, the system has more flexibility as to how many jobs it needs to execute in parallel.

To reiterate, the project profile can enable a resource manager to allocate resources for a very specific task. For example, a resource manager can allocate job slots so that a particular user can execute a particular application for a particular project. Some embodiments use a UNIX group identifier to identify users for whom the resources have been allocated. In other words, the resource manager can allocate job slots so that users within a particular UNIX group associated with a project can execute a particular application for the project. The system may understand preconfigured flows and the sequence of steps within a flow. Further, the system may also provide the ability, on a per project basis, to register a custom flow and the sequence of steps for the flow.

Users 312 can submit jobs using queuing system 316's user interface, and the submitted jobs can be queued. To submit a job, the user can provide the project name and any other information that the system needs to handle the job. For example, in LSF, a job is usually submitted using the bsub function which has an input parameter called "project." In one embodiment, the user can assign a value to this input parameter which encodes the project name, the step within the flow, and/or any other relevant information associated with the job.

PBA engine 310 can receive queuing system 316's state information which can include information about the jobs in pending state 314. Next, PBA engine 310 can use project profiles 308 and queuing system 316's state information to determine whether a particular job needs special handling, i.e., whether the job needs to be handled in a way that is different from the way the queuing system would have normally handled the job. If PBA engine 310 determines that a job needs special handling, PBA engine 310 can then use queuing system 316's interface to dynamically configure the job's properties and/or configure the queuing system's behavior so that the job is handled appropriately.

Queuing system 316 can provide an abstraction of the resources in a compute farm. The abstraction can be represented as a collection of job slots 318. Job slots 318 can be of different types, e.g., light interactive job slots 320, heavy interactive job slots 322, overflow job slots 324, and batch job slots 326. In some embodiments, allocating jobs to job slots 318 is managed solely by queuing system 316, and the only way to influence the behavior of queuing system 316 is by using queuing system 316's interface, e.g., a command line interface (CLI) or an application programming interface (API).

Note that the queuing system's interface may allow a user to perform user-specific processing on submitted jobs before the queuing system performs its own processing. For example, LSF's esub command enables a user to provide instructions that can be used to validate, modify, or reject jobs when they are submitted. Specifically, some embodiments of the present invention may use LSF's esub command to identify jobs whose priority may need to be modified, and to modify the job priorities if required.

During operation, different types of jobs may be submitted to queuing system 316. For example, jobs 328, 330, 332, and 334 may be submitted to queuing system 316. Specifically, job 328 may be a heavy interactive job, job 330 may be a batch job, job 332 may be a light interactive job, and job 334 may also be a batch job. When these jobs are submitted, queuing system 316 may execute user-specified instructions to identify jobs which may need special handling. For example, job 330 may be a batch job which has been flagged as a PBA job by the user-specified instructions which are executed whenever a new job is submitted to the queuing system (the fact that job 330 has been flagged as a PBA job is shown in the figure with a "P"). On the other hand, job 334 can be a normal batch job that has not been flagged as a PBA job (the fact that job 334 is a "normal" job is shown in the figure with an "N").

Jobs 328 and 332 may be handled in the usual manner by the queuing system. For example, job 328 will be assigned to a heavy interactive job slot if it is available, and if it is not available, job 328 will wait in pending state 314 until a slot becomes available. Similarly, job 332 will be assigned to a light interactive job slot if it is available, and if it is not available, job 332 will wait in pending state 314 until a slot becomes available.

However, due to PBA, the queuing system may handle batch jobs differently. Specifically, if a batch job slot is available, the system will assign the job slot to the next batch job that is submitted to the queuing system. If no batch job slots are available, the queuing system will queue a normal batch job in the queue. However, if no batch job slots are available, and if the job has been flagged as a PBA batch job, PBA engine 310 may select a normal batch job that is currently executing, and suspend or re-queue the selected batch job. Next, PBA engine 310 may change the PBA batch job's priority so that queuing system 316 schedules the PBA batch job in the recently freed job slot.

Some embodiments of the present invention use only one queue in the queuing system. Specifically, the queuing system may support multiple queues that have different priorities, but some embodiments of the present invention use a single queue for batch jobs in the queuing system, i.e., they don't have a separate queue for PBA jobs and normal jobs. These embodiments manipulate the priority of the jobs in the queue to achieve their goal.

Specifically, PBA has two types of jobs: PBA jobs and normal jobs. PBA can ensure that PBA jobs are always scheduled before normal jobs by ensuring that the lowest priority of any PBA job is always higher than the highest priority of any normal job. Similarly, when PBA removes a job from the queuing system, it can assign a priority value to the removed job so that the removed job has the highest priority among normal jobs. This ensures that the removed job will be scheduled before any other normal job that is pending in the queue.

In this manner, the system uses idle job slots whenever possible, and guarantees that job slots will be available whenever a PBA job needs it. In other words, PBA makes it appear as if the system has dedicated job slots for a project, whereas in reality, the system has not dedicated the job slots to the project.

Note that a conventional queuing system cannot implement the type of allocation that is usually required when a project nears a milestone deadline. For example, for a project to meet its deadline, a specific user may need to execute a specific application for a specific amount of time on a dedicated computer system. Conventional systems typically achieve this by actually dedicating a computer system to the project. However, as explained above, this approach usually leads to wasted resources, requires manual reconfiguration of the queuing system, and can impact the workflow of other projects.

In contrast, PBA guarantees that the particular user will be able to use the resource that he or she needs to meet the project deadline. Further, PBA prevents wasting resources, it obviates manual reconfiguration of the queuing system, and it minimizes the impact on other projects. Specifically, some embodiments of the present invention use PBA only for projects that require guaranteed resources to meet a project milestone.

Note that some queuing systems may ensure that a user and/or a project do not execute more than a certain number of jobs. On the other hand, the PBA system can dynamically manipulate the jobs in the queuing system to guarantee that a project and/or a user can execute at least a minimum number of jobs.

"Surgical" Dummy Job Insertion

Figure 4:
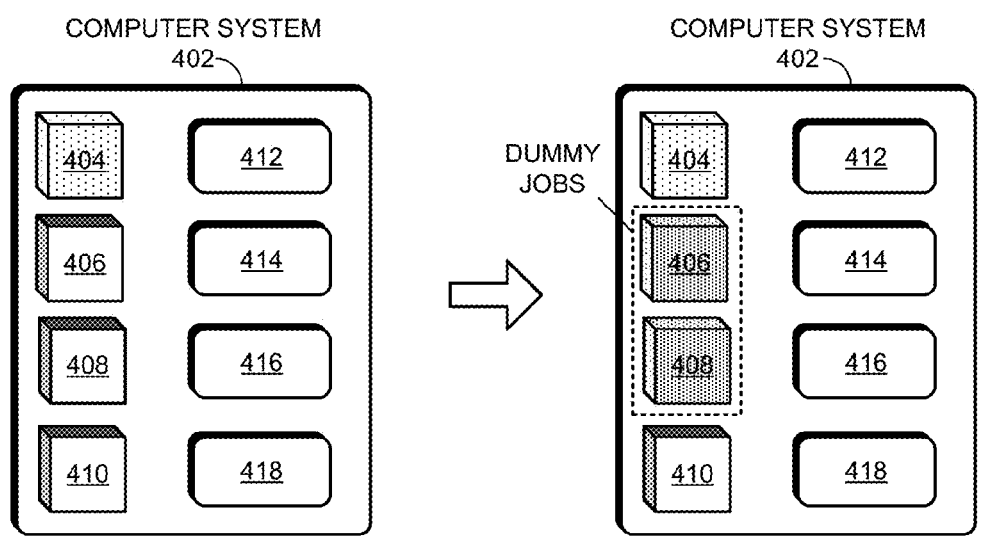
FIG. 4 illustrates how dummy jobs can be "surgically" inserted into a computer system to prevent undesired allocation of resources in accordance with an embodiment of the present invention.

FIG. 4 illustrates how dummy jobs can be "surgically" inserted into a computer system to prevent undesired allocation of resources in accordance with an embodiment of the present invention.

Computer system 402 can be part of a compute farm. To illustrate dummy job insertion, let us assume that computer system 402 can accommodate four job slots, namely job slots 404, 406, 408, and 410. Further, let us assume that computer system 402 has 16 GB of memory. Computer system 402's memory is illustrated in FIG. 4 as four memory chunks of size 4 GB, namely, memory chunks 412, 414, 416, and 418. Let us also assume that a job slot is associated with a 4 GB chunk of memory.

Now, suppose that the system schedules a job in job slot 404, and suppose this job is expected to use 12 GB of memory. If the system simply schedules the job without taking any further action, it can lead to serious performance problems. For example, the system may cause thrashing if it schedules another job in job slot 406 which also uses 12 GB of memory. Hence, there is a need for techniques and systems to prevent the system from assigning jobs to job slots in a manner that will lead to performance problems.

Some embodiments of the present invention submit dummy jobs to the queuing system so that the queuing system does not schedule jobs in a manner that would cause performance problems. Specifically, in the example shown in FIG. 4, the system can allocate job slots 406 and 408 to two dummy jobs, thereby ensuring that the queuing system does not assign these job slots to real jobs which may cause the system to thrash.

Note that the dummy jobs are "surgically" inserted by using the queuing system's interface. Some embodiments of the present invention modify the queuing system's behavior without changing the queuing system's software. The queuing system's behavior is modified because, once the queuing system assigns the dummy jobs to job slots 406 and 408, the queuing system will schedule at most one more job on computer system 402 which requires a standard amount of resources, thereby preventing the system from thrashing.

Note that the system may know the configurations of all the computer systems in the compute farms, and the system may divide the memory on a system equally among the processors. For example, in a four processor system with 16 GB of memory, the system may associate each batch job slot with a processor and 4 GB of memory. On the other hand, in a 4 processor system with 64 GB of memory, each batch job slot can be associated with a processor and 16 GB of memory.

Based on the above discussions, the following sections describe systems and techniques for allocating resources in a compute farm.

Process for Allocating Resources in a Compute Farm

Figure 5:
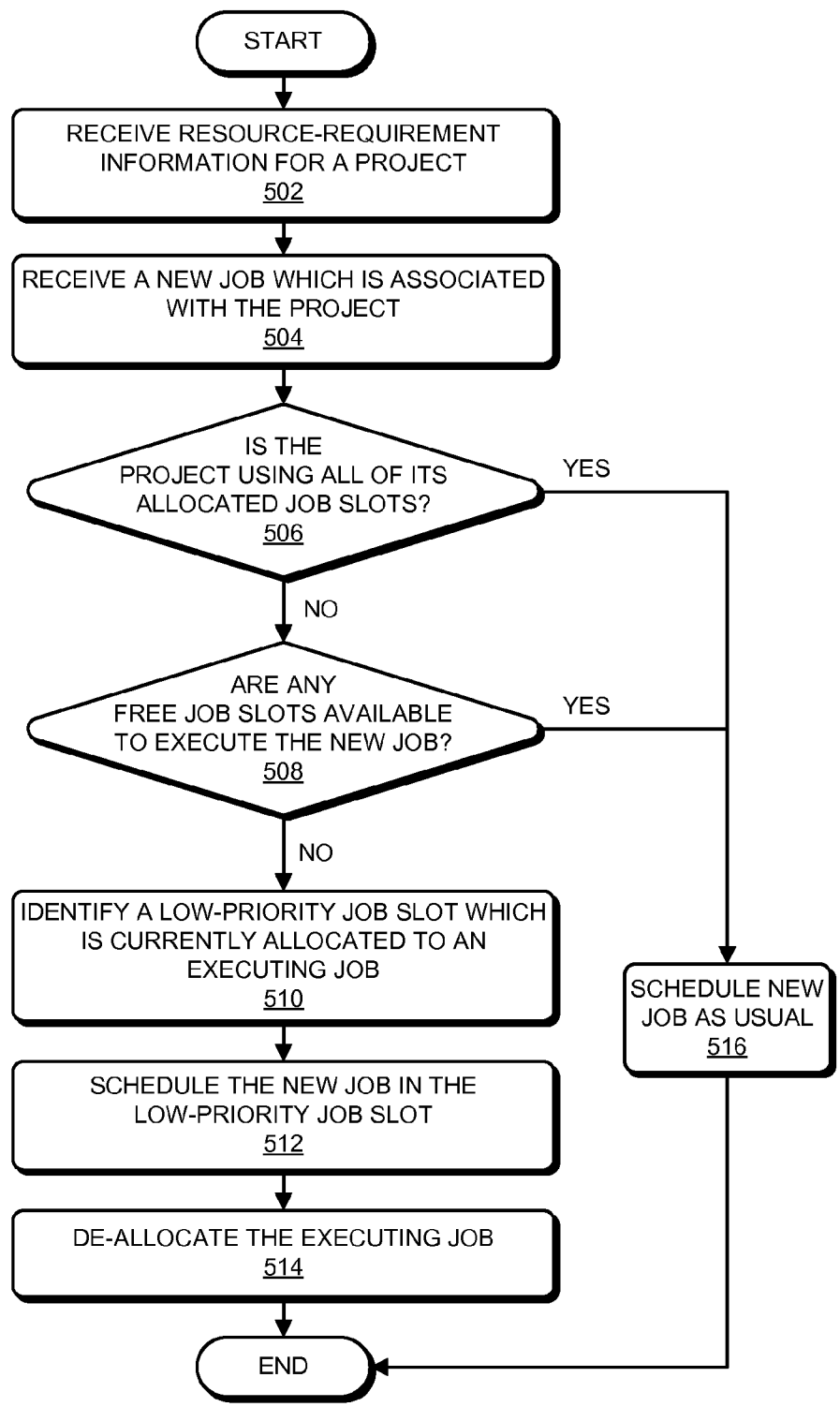
FIG. 5 presents a flowchart that illustrates a process for managing resources in a compute farm in accordance with an embodiment of the present invention.

FIG. 5 presents a flowchart that illustrates a process for managing resources in a compute farm in accordance with an embodiment of the present invention. As mentioned above, the compute farm's resources can be represented using a set of job slots, and the set of job slots can be managed by a queuing system.

The low-priority job slot is not necessarily associated with the last started job. Instead, the system can identify the low-priority job slot based on a number of factors. The system may decide not to select a job slot which is executing a job that is associated with a project which has an allocation. In other words, the jobs currently executing in the system may be divided into two types of jobs: those that are "normal" jobs, and those that are "PBA" jobs, i.e., those jobs that have been scheduled by PBA. When the system identifies the low-priority job slot, it may decide to consider job slots that are executing normal jobs, but the system may decide not to consider job slots that are executing PBA jobs.

Next, the system can receive a new job which is associated with the project (step 504). Specifically, if the project specifies that the job slots are to be used to enable a first user to perform a first step of the project, the system may determine whether the new job is associated with the first step of the project, and whether the new job has been submitted by the first user. If both of these conditions are true, the system may flag the job as a "PBA" job, and schedule the job accordingly; otherwise, the system may flag the job as a "normal" job, and schedule the job in the usual manner.

The system can then determine whether the project is using all of its allocated job slots (step 506). Specifically, the system can determine a second quantity of job slots which have been allocated to jobs that are associated with the project, and compare the second quantity of job slots with the first quantity of job slots to determine whether the project is using all of its allocated job slots.

Next, the system can determine whether there are any free job slots available to execute the new job (step 508).

If the project is using all of its allocated job slots, or if free job slots are available to execute the new job, the system can schedule the new job as usual (step 516).

On the other hand, if the project is not using all of its allocated job slots, and if no free job slots are available to execute the new job, the system can replace an executing job with the new job. Specifically, in response to determining that the second quantity of job slots is less than the first quantity of job slots, and that no job slots are available for executing a first job which is associated with the project, the system can execute the new job using the following process.

First, the system can identify a low-priority job slot which is currently allocated to an executing job (step 510). Note that the job that is executing in the low-priority job slot is also known as the least valued job.

The low-priority job slot is not necessarily associated with the last started job. Instead, the system can identify the low-priority job slot based on a number of factors. The system may decide not to select a job slot which is executing a job that is associated with a project which has an allocation. In other words, the jobs currently executing in the system may be divided into two types of jobs: those that are "normal" jobs, and those that are "PBA" jobs, i.e., those jobs that have been scheduled by PBA. When the system identifies the low-priority job slot, it may decide to consider job slots that are executing normal jobs, but the system may decide not to consider job slots that are executing PBA jobs.

In some embodiments, the system uses the following factors to identify the low-priority job slot: how long ago was the job started, how over-subscribed is the project that is associated with the job, and how many jobs does the project have in the pending state. A job slot's priority may be lower if: (1) the job was recently started, (2) the project associated with the job is heavily over-subscribed, and/or (3) the project associated with the job has a large number of pending jobs.

As in illustrative example, suppose jobs $J_1$ and $J_2$ were started at the same time, but that the project associated with job $J_1$ is more over-subscribed than the project associated with $J_2$. In this scenario, the system may determine that the job slot for $J_2$ has a lower priority than the job slot for $J_1$. If jobs $J_1$ and $J_2$ were started at the same time, and if the projects associated with jobs $J_1$ and $J_2$ are equally over-subscribed, the system may look at the number of pending jobs to determine the priority of the job slots. Specifically, if the project associated with job $J_1$ has fewer pending jobs than the project associated with job $J_2$, the system may determine that the job slot for $J_2$ has a lower priority than the job slot for $J_1$.

Next, the system can schedule the new job in the low-priority job slot (step 512). The system can then de-allocate the executing job (step 514). De-allocating the executing job can involve (1) stopping and re-queuing the executing job, or (2) suspending the executing job. The system can use an environment variable associated with the job to determine whether to stop and re-queue the job or whether to suspend the job. Since the environment variable's value can be set by the user, the user has full control over how his or her job will be treated if it is de-allocated. Queuing systems usually determine whether to re-queue or to suspend a job based on the queue in which the job was submitted. In contrast, some embodiments of the present invention allow the user to control the re-queue/suspend decision on a per-job basis.

Scheduling the new job before de-allocating the executing job can enable the system to ensure that the queuing system does not schedule a different job in the freed-up job slot. Alternatively, the system can assign a high priority to the new job so that the queuing system will allocate a job slot to the new job as soon as a job slot becomes available. The system can then de-allocate the low-priority job slot, thereby causing the queuing system to allocate the low-priority job slot to the new job.

Figure 6:
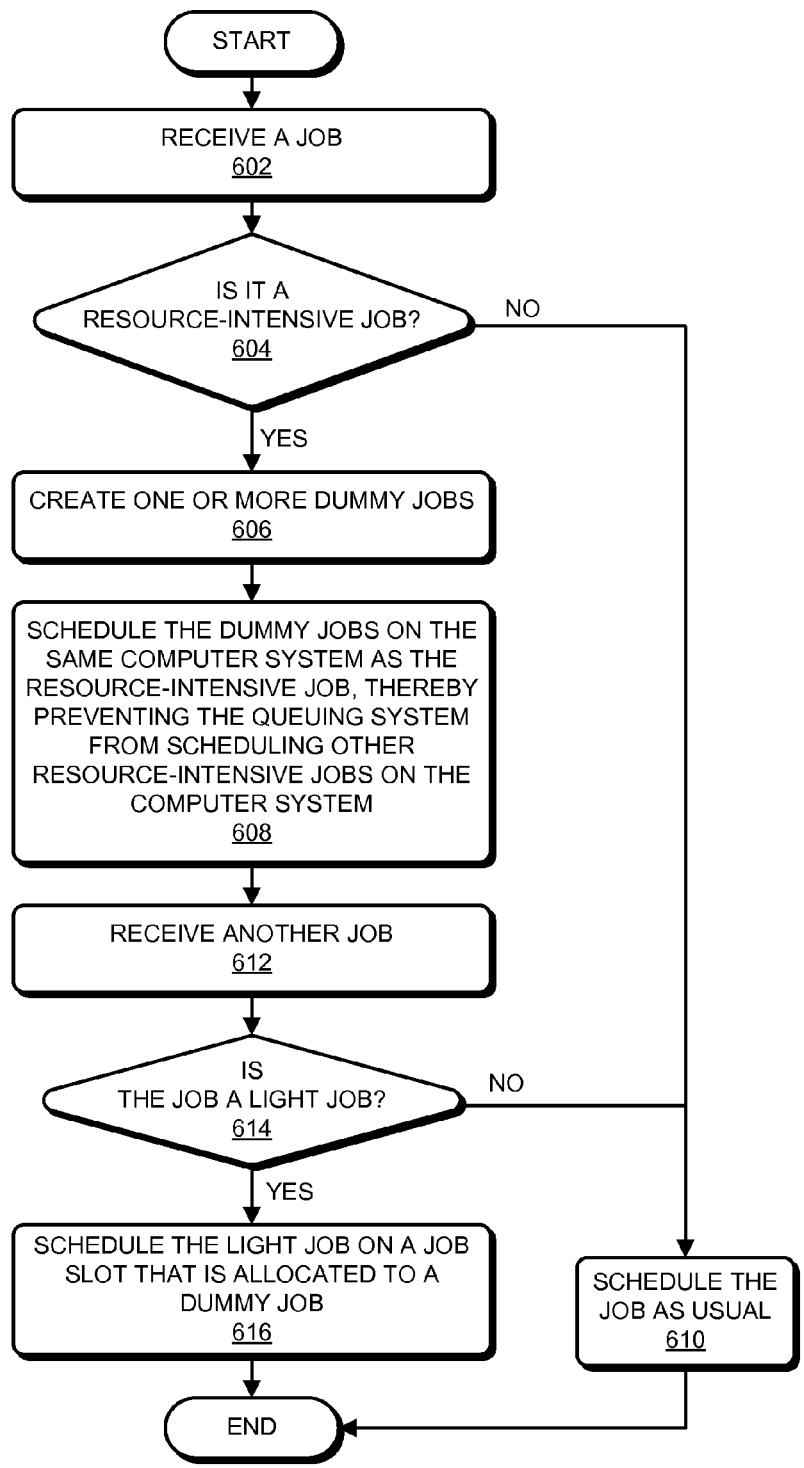
FIG. 6 presents a flowchart that illustrates a process for inserting a dummy job to prevent undesired allocation of resources in accordance with an embodiment of the present invention.

FIG. 6 presents a flowchart that illustrates a process for inserting a dummy job to prevent undesired allocation of resources in accordance with an embodiment of the present invention.

The process can begin by receiving a job (step 602). Note that each job slot represents a standard amount of resources in the compute farm. Hence, when the queuing system allocates a job slot to a job, it implicitly assumes that the job will use the standard amount of resources.

Next, the system can determine if the job is a resource-intensive job (step 604). A resource-intensive job can be defined as a job that is expected to use more resources than the standard amount of resources. Note that the computer system's performance may substantially deteriorate if the queuing system schedules multiple resource-intensive jobs on the same computer system. For example, a resource-intensive job may use an amount of memory which is greater than the amount of memory associated with a job slot, and hence, scheduling multiple resource-intensive jobs on the same computer system can cause thrashing, thereby substantially deteriorating the computer system's performance.

If the job is not a resource-intensive job, the system can schedule the job as usual (step 610).

On the other hand, if the job is a resource-intensive job, the system can create one or more dummy jobs (step 606).

Next, the system can schedule the dummy jobs on the same computer system as the resource-intensive job, thereby preventing the queuing system from scheduling other resource-intensive jobs on the computer system (step 608).

Specifically, the queuing system may support commands that enable a process to specify the computer system on which the queuing system should schedule a job. Hence, the process can specify to the queuing system that the resource-intensive job and the dummy jobs be scheduled on the same computer system. Specifically, the process can change parameters associated with the dummy job to indicate to the queuing system that the dummy job is to be scheduled on a particular machine. Next, the process can submit the dummy job to the queuing system, thereby causing the queuing system to schedule the dummy job on the particular machine.

Note that, if the system receives a light job, i.e., a job that uses less than the standard amount of resources, the system can execute the light job on a job slot that is allocated to a dummy job, thereby improving utilization.

Specifically, the system may receive another job (step 612). Next, the system may determine whether the job is a light job (step 614). A light job can be a job which when scheduled on the same computer system as the resource-intensive job is not expected to substantially degrade the computer system's performance.

If the job is not a light job, the system may schedule the job as usual (step 610). On the other hand, if the job is a light job, the system can execute the light job on a job slot that is allocated to a dummy job (step 616). Alternatively, the system can de-allocate a job slot that is currently allocated to a dummy job, and allocate the job slot to the light job. In this manner, the system can improve the computer system's utilization without deteriorating the computer system's performance.

CONCLUSION

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for allocating resources in a compute farm, wherein the compute farm's resources are represented using a set of job slots, and wherein the set of job slots are managed by a queuing system, the method comprising:
   a priority-based allocation (PBA) layer receiving information about a first job that is pending in the queuing system, wherein the information indicates that the first job is associated with a first project, and wherein the PBA layer is separate from the queuing system;
   in response to the PBA layer determining that the number of job slots in the compute farm that are allocated to jobs associated with the first project is less than the number of job slots allocated to the first project, and that no free job slots are available for executing the first job,
      the PBA layer identifying a low-priority job slot that is currently executing a second job associated with a second project, wherein the number of job slots in the compute farm that are executing jobs associated with the second project is greater than the number of job slots allocated to the second project,
      the PBA layer providing a scheduling instruction to the queuing system via an interface of the queuing system, wherein the scheduling instruction instructs the queuing system to schedule the first job in the low-priority job slot, and
      the PBA layer providing a de-allocation instruction to the queuing system via the interface of the queuing system, wherein the de-allocation instruction instructs the queuing system to de-allocate the executing second job.

2. The method of claim 1, wherein the de-allocation instruction instructs the queuing system to stop and re-queue the executing second job.

3. The method of claim 1, wherein the de-allocation instruction instructs the queuing system to suspend the executing second job.

4. A non-transitory computer-readable storage medium storing instructions for a priority-based allocation (PBA) layer that when executed by a computer cause the computer to perform a method for allocating resources in a compute farm, wherein the compute farm's resources are represented using a set of job slots, and wherein the set of job slots are managed by a queuing system, the method comprising:
   the PBA layer receiving information about a first job that is pending in the queuing system, wherein the information indicates that the first job is associated with a first project, and wherein the PBA layer is separate from the queuing system;
   in response to the PBA layer determining that the number of job slots in the compute farm that are allocated to jobs associated with the first project is less than the number of job slots allocated to the first project, and that no free job slots are available for executing the first job,
      the PBA layer identifying a low-priority job slot that is currently executing a second job associated with a second project, wherein the number of job slots in the compute farm that are executing jobs associated with the second project is greater than the number of job slots allocated to the second project,
      the PBA layer providing a scheduling instruction to the queuing system via an interface of the queuing system, wherein the scheduling instruction instructs the queuing system to schedule the first job in the low-priority job slot, and
      the PBA layer providing a de-allocation instruction to the queuing system via the interface of the queuing system, wherein the de-allocation instruction instructs the queuing system to de-allocate the executing second job.

5. The computer-readable storage medium of claim 4, wherein the de-allocation instruction instructs the queuing system to stop and re-queue the executing second job.

6. The computer-readable storage medium of claim 4, wherein the de-allocation instruction instructs the queuing system to suspend the executing second job.

7. A computer system for allocating resources in a compute farm, wherein the compute farm's resources are represented using a set of job slots, and wherein the set of job slots are managed by a queuing system, the computer system comprising:
   a processor; and
   a storage medium storing instructions for a priority-based allocation (PBA) layer that, when executed by the processor, cause the computer system to perform a method, comprising:
      the PBA layer receiving information about a first job that is pending in the queuing system, wherein the information indicates that the first job is associated with a first project, and wherein the PBA layer is separate from the queuing system;

in response to the PBA layer determining that the number of job slots in the compute farm that are allocated to jobs associated with the first project is less than the number of job slots allocated to the first project, and that no free job slots are available for executing the first job, the PBA layer identifying a low-priority job slot that is currently executing a second job associated with a second project, wherein the number of job slots in the compute farm that are executing jobs associated with the second project is greater than the number of job slots allocated to the second project, the PBA layer providing a scheduling instruction to the queuing system via an interface of the queuing system, wherein the scheduling instruction instructs the queuing system to schedule the first job in the low-priority job slot, and the PBA layer providing a de-allocation instruction to the queuing system via the interface of the queuing system, wherein the de-allocation instruction instructs the queuing system to de-allocate the executing second job.

8. The computer system of claim 7, wherein the de-allocation instruction instructs the queuing system to stop and re-queue the executing second job.

9. The computer system of claim 7, wherein the de-allocation instruction instructs the queuing system to suspend the executing second job.

* * * * *